US010962154B2

(12) United States Patent
Heaton et al.

(10) Patent No.: US 10,962,154 B2
(45) Date of Patent: Mar. 30, 2021

(54) CONNECTOR FOR PIPES

(71) Applicant: FLEXSTEEL PIPELINE TECHNOLOGIES, Houston, TX (US)

(72) Inventors: Andrew James Heaton, Lincolnshire (GB); Brian Lee Dillinger, Missouri City, TX (US); Jagtar Singh Thethy, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 144 days.

(21) Appl. No.: 15/515,838

(22) PCT Filed: Sep. 29, 2015

(86) PCT No.: PCT/US2015/052809
§ 371 (c)(1),
(2) Date: Mar. 30, 2017

(87) PCT Pub. No.: WO2016/053949
PCT Pub. Date: Apr. 7, 2016

(65) Prior Publication Data
US 2017/0248259 A1 Aug. 31, 2017

Related U.S. Application Data

(60) Provisional application No. 62/057,683, filed on Sep. 30, 2014.

(51) Int. Cl.
*F16L 21/08* (2006.01)
(52) U.S. Cl.
CPC ..................... *F16L 21/08* (2013.01)
(58) Field of Classification Search
CPC . F16L 21/08; F16L 25/12; F16L 37/14; F16L 37/142; F16L 37/144; F16L 37/146;
(Continued)

(56) References Cited

U.S. PATENT DOCUMENTS 2,597,482 A * 5/1952 Harrison ............... F16L 37/148
  220/681
3,127,199 A * 3/1964 Roe ....................... F16L 27/125
  285/145.4
(Continued)

FOREIGN PATENT DOCUMENTS

AU   2015324083   10/2019
CN   107002917    8/2017
(Continued)

OTHER PUBLICATIONS

International Bureau of WIPO; PCT International Preliminary Report on Patentability, issued in connection to PCT/US2015/052809; dated Apr. 4, 2017; 10 pages; Switzerland.
(Continued)

*Primary Examiner* — Aaron M Dunwoody
(74) *Attorney, Agent, or Firm* — Greenberg Traurig, LLP; Dwayne Mason; Ira Hatton

(57) ABSTRACT

A pipe connector for connecting pipes that includes an elongate tubular body having an outer diameter, a sleeve disposed over the elongate tubular body, and a first wire ring. The elongate tubular body that has a groove formed on the outer diameter. The sleeve has a groove formed on an inner diameter that is spaced from a first end of the sleeve and is aligned with the groove of the elongate tubular member. The first wire ring is disposed within the groove of the elongate tubular body and within the groove of the sleeve such that the sleeve is coupled to the elongate tubular body by the first wire ring.

12 Claims, 5 Drawing Sheets

(58) Field of Classification Search
CPC ....... F16L 37/148; F16L 25/01; F16L 37/085; F16L 37/088
USPC .................................................. 285/321, 305
See application file for complete search history.

(56) References Cited

U.S. PATENT DOCUMENTS

| | | | | |
|---|---|---|---|---|
| 3,314,696 A * | 4/1967 | Ferguson | .............. | F16L 37/088 24/665 |
| 3,606,401 A * | 9/1971 | Schwarz | ................. | B29C 65/54 285/294.4 |
| 3,860,742 A * | 1/1975 | Medney | .................. | F16L 25/01 138/127 |
| 4,063,760 A * | 12/1977 | Moreiras | ................. | F16L 13/00 285/242 |
| 4,120,520 A * | 10/1978 | Ahlstone | ................. | E02D 5/523 285/18 |
| 4,124,233 A * | 11/1978 | Ahlstone | ................. | E02D 5/523 285/18 |
| 4,269,436 A * | 5/1981 | Medney | ................. | F16L 37/148 285/179 |
| 4,278,276 A * | 7/1981 | Ekman | .................. | F16L 37/088 285/321 |
| 4,294,473 A * | 10/1981 | Ekman | .................... | F16L 19/00 285/321 |
| 4,426,105 A * | 1/1984 | Plaquin | ................ | E21B 17/043 285/3 |
| 4,884,829 A * | 12/1989 | Funk | ....................... | B60R 16/08 285/24 |
| 4,927,192 A * | 5/1990 | Ungchusri | .......... | F16L 19/0231 285/305 |
| 5,131,692 A * | 7/1992 | Lemons | .................. | E21B 21/01 285/334.2 |
| 5,400,695 A | 3/1995 | Walker | | |
| 5,813,705 A | 9/1998 | Dole | | |
| 5,964,483 A * | 10/1999 | Long | ..................... | F16L 37/144 285/305 |
| 6,761,105 B2 * | 7/2004 | Keaton | ............... | F15B 15/1438 92/128 |
| 7,364,207 B2 * | 4/2008 | McGee | ............... | F16L 19/0206 285/321 |
| 7,914,050 B2 | 3/2011 | Udhofer et al. | | |
| 8,240,719 B2 | 8/2012 | Udhofer et al. | | |
| 8,764,067 B2 * | 7/2014 | Bundy | .................. | F16L 37/148 285/305 |
| 2003/0025096 A1 * | 2/2003 | Jeory | ..................... | F16L 29/02 251/149 |
| 2004/0090066 A1 * | 5/2004 | Hoffmann | ............. | F16L 37/088 285/305 |
| 2006/0076776 A1 * | 4/2006 | Beeren | .................... | F16L 21/08 285/374 |
| 2006/0202476 A1 * | 9/2006 | Eggert | ................. | F16L 37/088 285/305 |
| 2007/0052237 A1 | 3/2007 | Udhofer et al. | | |
| 2008/0018107 A1 * | 1/2008 | Vogel | ..................... | F16L 21/08 285/328 |
| 2008/0136178 A1 | 6/2008 | Udhofer et al. | | |
| 2009/0058083 A1 * | 3/2009 | Dorman | ................. | F16L 37/144 285/309 |
| 2010/0019490 A1 | 1/2010 | Udo et al. | | |
| 2011/0109079 A1 | 5/2011 | Hegler et al. | | |
| 2012/0133127 A1 * | 5/2012 | Gilbreath | ............ | F16L 19/0231 285/317 |
| 2015/0084329 A1 * | 3/2015 | Freudendahl | ......... | F16L 21/035 285/91 |
| 2016/0273688 A1 * | 9/2016 | Considine, Jr. | ......... | F16L 21/08 |
| 2016/0356411 A1 * | 12/2016 | Clapper | .................. | F16L 17/02 |
| 2017/0102102 A1 * | 4/2017 | Goble | ..................... | F16L 21/08 |
| 2017/0248259 A1 | 8/2017 | Heaton | | |

FOREIGN PATENT DOCUMENTS

| | | |
|---|---|---|
| DE | 29610385 | 8/1996 |
| EA | 201790744 | 9/2017 |
| EP | 0877192 | 11/1998 |
| EP | 2128510 | 12/2009 |
| EP | 3201509 | 8/2017 |
| JP | 10-318456 | 12/1998 |
| JP | 2002-181263 | 6/2002 |
| JP | 2002-295778 | 10/2002 |
| JP | 2002-295778 | 10/2006 |
| SG | 11201702590 S | 1/2019 |
| WO | 1999/001691 | 1/1999 |
| WO | 99001691 | 1/1999 |
| WO | 2016/053949 | 4/2016 |
| WO | 2016053949 | 4/2016 |

OTHER PUBLICATIONS

Korean Intellectual Property Office; PCT Written Opinion of the International Searching Authority, issued in connection to PCT/US2015/052809; dated Jan. 7, 2016; 9 pages; Korea.

Australian Government, IP Australia; Examination Report No. 1 for Standard Patent Application, issued in connection to AU2015324083; dated Sep. 14, 2018; 5 pagers; Australia.

Canadian Intellectual Property Office; Examiner Report, issued in connection to CA2963094; dated Jun. 26, 2019; 9 pages; Canada.

The Sate Intellectual Property Office of China; First Office Action, issued in connection to CN201580065154.1; dated Jul. 25, 2018; 34 pages; China.

China National Intellectual Property Administration; Notificaiton to Go Through Formalities of Registration, issued in connection to CN201580065154.1; dated May 28, 2019; 6 pages; China.

Republic of Colombia, Superintendent of Industry and Commercial; Office Action, issued in connection to Application No. NC2017/0004254; dated May 3, 2018; 6 pages; Colombia.

Republic of Colombia, Superintendent of Industry and Commercial; Second Office Action, issued in connection to Application No. NC2017/0004254; dated Nov. 14, 2018; 14 pages; Colombia.

Eurasion Patent Office; Official Action, issued in connection to application No. 201790744/31; dated Oct. 17, 2018; 6 pages; Eurasia.

European Patent Office; Communication Pursuant to Rule 164(1) EPC, issued in connection to EP15845615.2; dated Mar. 27, 2018; 14 pages; Europe.

European Patent Office; Extended European Search Report, issued in connection to EP15845615.2; dated Jun. 26, 2018; 13 pages; Europe.

Australian Government, IP Australia; Notice of Acceptance for Patent Aplication, issued in connection to AU2015324083; dated Sep. 19, 2019; 3 pagers; Australia.

European Patent Office; Extended European Search Report, issued in connection to EP19157643.8; dated Oct. 1, 2019; 8 pages; Europe.

Brazilian Patent and Trademark Office; Preliminary Office Action, issued in connection to application No. P1120170066289; dated Jan. 21, 2020; 6 pages; Brazil.

Korean Intellectual Property Office; PCT International Search Report, issued in connection to PCT/US2015/052809; dated Jan. 7, 2016; 3 pages; Korea.

Intellectual Property Office of Saudi Arabia; Examination Report, issued in connection to application No. 517381210; dated Apr. 2020; 6 pages; Saudi Arabia.

Ausralian Government, IP Australia; Examination Report No. 1 for Standard Patent Application, issued in connection to AU2020200051; dated Jun. 22, 2020; 4 pages; Australia.

Republic of Colombia, Superintendent of Industry and Commercial; Office Action, issued in connection to Application No. NC2017/0004254; dated Jun. 18, 2020; 12 pages; Colombia.

Mexican Patent Office; Official Action, issued in connection to application No. MX/a/2017/004122; dated Jul. 15, 2020; 3 pages; Mexico.

(56) References Cited

OTHER PUBLICATIONS

National Institute of Industrial Property of Argentina; Office Action, issued in connection to application No. 20150103157; dated Jan. 3, 2020; 2 pages; Argentina.
Canadian Intellectual Property Office; Examiner Report, issued in connection to CA2963094; dated Mar. 9, 2020; 3 pages; Canada.
Brazilian Patent and Trademark Office; Preliminary Office Action, issued in connection to applicaiton No. PI120170066289; dated Jan. 21, 2020; 6 pages; Brazil.
Intellectual Property Corporation of Malaysia; Substantive Examination Adverse Report, issued in connection to application No. PI2017000474; dated Sep. 23, 2020; 3 pages; Malaysia.
China National Intellectual Property Administration; First Office Action, issued in connection to CN2019107400652; dated Sep. 24, 2020; 21 pages; China.

* cited by examiner

CONNECTOR FOR PIPES

BACKGROUND

Description of Related Art

A pipe connector may be used to connect pipes to form a pipeline. Pipe connectors are useful for connecting unbonded flexible pipe, which may be used to transmit fluid such as a production fluid like oil or gas from one location to another. Such flexible pipe may be used for offshore purposes as well as onshore or over land purposes. Extensive welding is used to form some existing pipe connectors, and while the welded pipe connectors connect flexible pipes together, welding is an expensive and time consuming process. Certified welders, welding materials, and weld inspections make welding costly.

Interference fits are used between parts in order to form other existing pipe connectors. While the pipe connectors formed by interference fits connect flexible pipes together, parts must be held to very tight tolerances, which is costly in manufacturing, and heat and liquid nitrogen may be used to assemble the pipe connector. Interference fit pipe connectors contain potential hazards and are costly.

SUMMARY OF INVENTION

Embodiments of the disclosure may provide a pipe connector. The pipe connector may include an elongate tubular body, a sleeve, and a first wire ring. The elongate tubular body may include a shoulder protruding from an outer diameter and a groove formed on the outer diameter that is spaced from the shoulder. The sleeve may be maintained over the elongate tubular body between the shoulder of the elongate tubular body and the groove of the elongate tubular body. The first wire ring may be disposed within the groove of the elongate tubular body such that the sleeve abuts the shoulder of the elongate tubular body on one side and the first wire ring on the other side.

Embodiments of the disclosure may further provide a method for assembling a pipe connector. The method may include coupling a sleeve to an elongate tubular body. In order to couple the sleeve to the elongate tubular body, the sleeve is installed over an outer diameter of the elongate tubular body until the sleeve is located between a shoulder protruding from the outer diameter of the elongate tubular body and a groove formed on the outer diameter of the elongate tubular body. A first wire ring may then be disposed within the groove on the elongate tubular body such that the sleeve abuts the shoulder of the elongate tubular body on one side and the first wire ring on the other side.

Other aspects and advantages of the invention will be apparent from the following description and the appended claims.

DETAILED DESCRIPTION

In one aspect, embodiments disclosed herein generally relate to an apparatus for connecting pipes. In other aspects, embodiments disclosed herein relate to a method of assembling the apparatus for connecting pipes.

Figure 1:
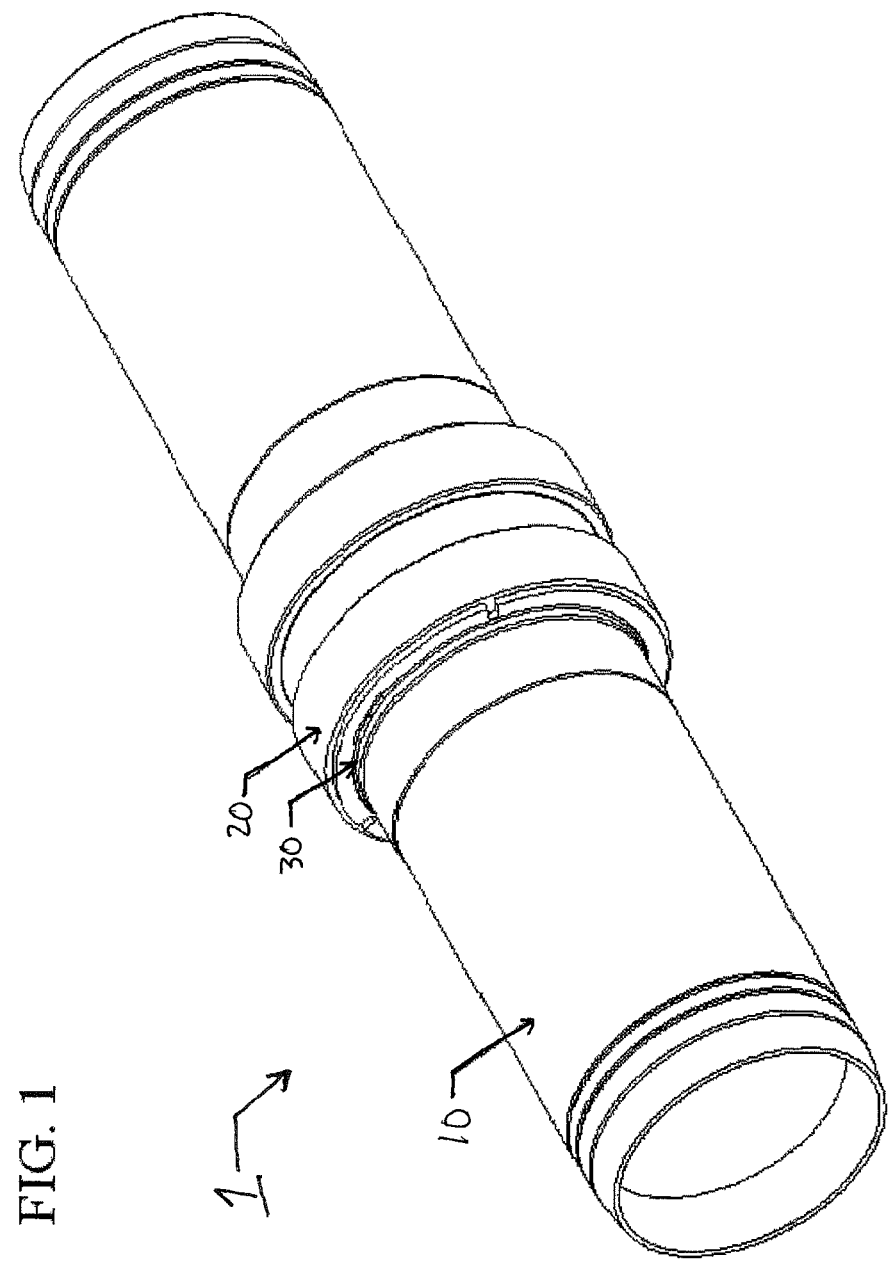
FIG. 1 includes an isometric view of a pipe connector according to one or more embodiments of the present disclosure.
Figure 2:
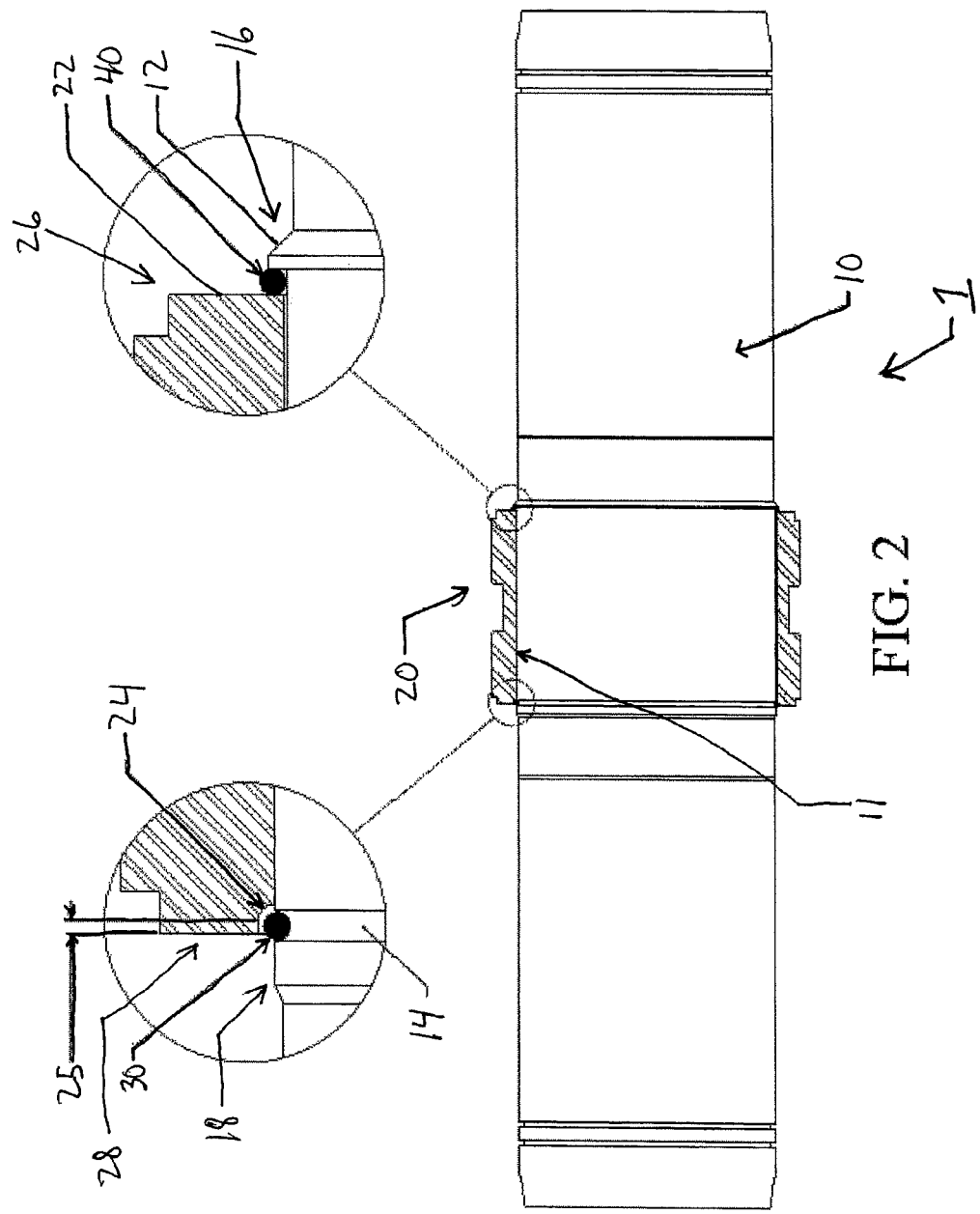
FIG. 2 includes a cross-sectional view of a pipe connector according to one or more embodiments of the present disclosure.

Referring to FIGS. 1 and 2, an isometric view and a cross-sectional view of a pipe connector 1 according to one or more embodiments of the present disclosure are shown. In one or more embodiments, the pipe connector 1 may include an elongate tubular body 10, a sleeve 20, a first wire ring 30, and a second wire ring 40. The elongate tubular body 10 may be coupled to the sleeve 20 using the first and second wire rings 30 and 40.

In one or more embodiments, the elongate tubular body 10 may have a raised portion 11 along an outer diameter of the elongate tubular body 10 such that an outer diameter of the raised portion 11 is greater than the outer diameter of the elongate tubular body 10. The raised portion 11 may be generally disposed in a center of the elongate tubular body 10. Further, the raised portion 11 of the elongate tubular body 10 may have a shoulder 12 located at a first end 16 of the raised portion. The shoulder 12 may protrude from the first end 16 of the raised portion 11 such that the outer diameter of the shoulder 12 is greater than the outer diameter of the raised portion 11. In one or more embodiments, a groove 14 may be formed on the outer diameter of the raised portion 11, and the groove 14 of the elongate tubular body 10 may be located adjacent to a second end 18 of the raised portion 11 such that the groove 14 of the elongate tubular body 10 is spaced from the shoulder 12. The groove 14 of the elongate tubular body 10 may be formed around the entirety of a circumference of the raised portion 11 of the elongate tubular body 10. In one or more embodiments, the elongate tubular body 10 may be made of super-duplex stainless steel.

In one or more embodiments, the sleeve 20 may have an inner diameter slightly larger than the outer diameter of the raised portion 11 of the elongate tubular body 10. Further, the sleeve 20 may have a central cut out region to aid in handling of the sleeve 20, but other profiles of the sleeve 20 may be utilized as discussed below. The sleeve 20 may be coupled to the elongate tubular body 10, and the sleeve 20 may be located over the raised portion 11 of the elongate tubular body 10. Further, the sleeve 20 may be disposed on the elongate tubular body 10 such that the sleeve 20 is located between the shoulder 12 of the elongate tubular body 10 and the groove 14 of the elongate tubular body 10. A first end 26 of the sleeve 20 may include a shoulder 22, and the sleeve 20 may be oriented on the elongate tubular body 10 such that the shoulder 22 of the sleeve 20 faces the shoulder 12 of the elongate tubular body 10. Further, the sleeve 20 may include a groove 24 formed on an inner diameter of the sleeve 20, and the groove 24 of the sleeve 20 may be located adjacent to a second end 28 of the sleeve 20 such that the groove 24 of the sleeve 20 faces the groove 14 of the elongate tubular body 10. In one or more embodiments, the groove 24 of the sleeve 20 may include an extended lip 25 such that the groove 24 of the sleeve 20 is extended to the second end 28 of the sleeve 20. In one or more embodiments, the sleeve 20 may be made of super-duplex stainless steel.

In one or more embodiments, the wire rings 30, 40 may be manufactured by forming wire stock to diameters sufficiently smaller than the diameter of the groove 14 of the elongate tubular body 10 and the diameter of the raised portion 11 of the elongate tubular body 10, respectively. The wire rings 30, 40 may be made from wire stock that is rolled into rings leaving ends of the rings free such that the wire rings 30, 40 may be spread in order to install the wire rings 30, 40 into the groove 14 of the elongate tubular body 10 and onto the outer diameter of the raised portion 11 of the elongate tubular body 10, respectively. Further, in one or more embodiments, the wire rings 30, 40 may be made of super-duplex stainless steel.

In one or more embodiments, the first wire ring 30 may be disposed within the groove 14 of the elongate tubular body 10 such that the sleeve 20 is located between the shoulder 12 of the elongate body 10 on the first end 26 of the sleeve 20 and the first wire ring 30 on the second end 28 of the sleeve 20. In one or more embodiments, the second wire ring 40 may be disposed between the shoulder 12 of the elongate tubular body 10 and the shoulder 22 of the sleeve 20 on the outer diameter of the raised portion 11 of the elongate tubular body 10. The shoulder 22 of the sleeve 20 may abut the second wire ring 40 on the first end 26 of the sleeve 20, and the groove 24 of the sleeve 20 may abut the first wire ring 30 on the second end 28 of the sleeve 20 such that the sleeve 20 is longitudinally fixed relative to the elongate tubular body 10. Further, in one or more embodiments, the sleeve 20 may be located such that the extended lip 25 of the groove 24 of the sleeve 20 extends over and covers the first wire ring 30 disposed within the groove 14 of the elongate tubular body 10. The extended lip 25 of the groove 24 of the sleeve 20 may maintain the first wire ring 30 within the groove 14 of the elongate tubular body 10.

In other embodiments, the second wire ring 40 may not be installed, and the sleeve 20 may be able to slide a small distance along the raised portion 11 of the elongate tubular body 10 between a first position in which the shoulder 22 of the sleeve 20 abuts the shoulder 12 of the elongate tubular body 10 and a second position in which the groove 24 of the sleeve 20 abuts the first wire ring 30 within the groove 14 of the elongate tubular body 10.

Assembly of pipe connector 1 may begin with sliding the sleeve 20 over the outer diameter of the elongate tubular body 10. The sleeve 20 may be oriented such that the shoulder 22 of the sleeve 20 is facing the shoulder 12 on the raised portion 11 of the elongate tubular body 10. The sleeve 20 may be shifted along the outer diameter of the elongate tubular body 10, including the raised portion 11, until the shoulder 22 of the sleeve 20 abuts the shoulder 12 of the elongate tubular body 10. When the shoulder 22 of the sleeve 20 abuts the shoulder 12 of the elongate tubular body 10, the groove 14 of the elongate tubular body may be exposed.

Next, the first wire ring 30 may be installed into the groove 14 of the elongate tubular body 10 to maintain the sleeve 20 over the raised portion 11 of the elongate tubular body. Installation of the first wire ring 30 may include spreading the first wire ring 30 such that an inner diameter of the first wire ring 30 is greater than the outer diameter of the raised portion 11 of the elongate tubular body 10, and then, aligning the spread first wire ring 30 with the groove 14 of the elongate tubular body 10, and finally, closing the first wire ring 30 within the groove 14 of the elongate tubular body 10.

Finally, the second wire ring 40 may be installed between the shoulder 12 of the elongate tubular body 10 and the shoulder 22 of the sleeve 20 to longitudinally fix the sleeve 20 in position over the raised portion 11 of the elongate tubular body 10 such that the sleeve 20 may not move relative to the elongate tubular body 10. Space may be created for the second wire ring 40 by shifting the sleeve 20 in a direction from the shoulder 12 of the elongate tubular body 10 towards the groove 14 of the elongate tubular body 10 until the groove 24 of the sleeve 20 abuts the first wire ring 30. When the groove 24 of the sleeve 20 abuts the first wire ring 30, the second wire ring 40 may be installed between the shoulder 12 of the elongate tubular body 10 and the shoulder 22 of the sleeve 20. Installation of the second wire ring 40 may include spreading the second wire ring 40 such that an inner diameter of the second wire ring 40 is greater than the outer diameter of the shoulder 12 of the elongate tubular body 10, and then, aligning the spread second wire ring 40 with a gap between the shoulder 12 of the elongate tubular body 10 and the shoulder 22 of the sleeve 20, and finally, closing the second wire ring 40 onto the outer diameter of the raised portion 11 of the elongate tubular body 10.

Figure 3A:
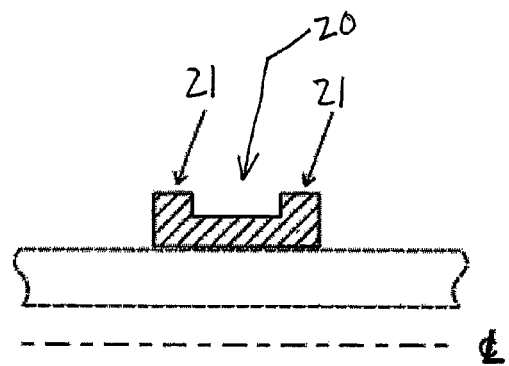
FIGS. 3A-3D includes cross-sectional views of possible profiles of a sleeve according to one or more embodiments of the present disclosure.
Figure 3B:
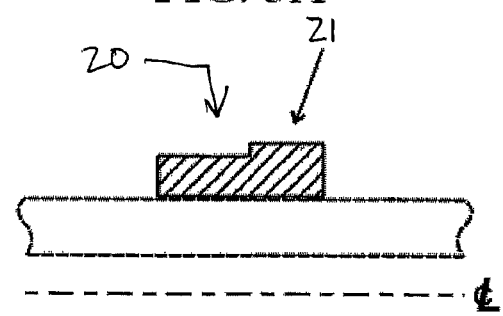
Figure 3C:
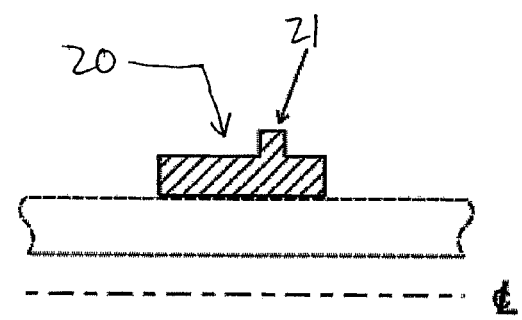
Figure 3D:
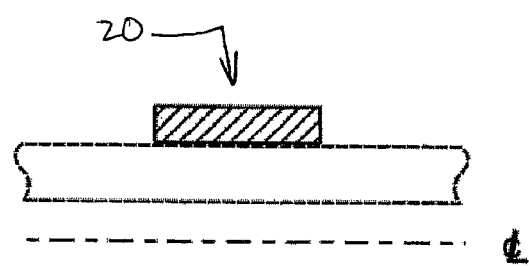

Referring to FIGS. 3A-3D, cross-sectional views of sleeves 20 of various profiles according to one or more embodiments of the present disclosure are shown. As shown in FIG. 3A, the sleeve 20 may have raised portions 21 that extend from an outer diameter of the sleeve 20. The raised portions 21 may be disposed at both ends of the sleeve 20 such that the sleeve 20 is generally U-shaped. Further, as shown in FIG. 3B, the sleeve 20 may have a single raised portion 21 at one end of the sleeve 20 such that the sleeve 20 is generally L-shaped. Furthermore, as shown in FIG. 3C, the sleeve may have a single raised portion 21 located at a predetermined location along the outer diameter of the sleeve 20 such that the raised portion 21 is spaced from the ends of the sleeve 20 and a center of the sleeve 20 and such that the sleeve 20 is generally T-shaped. In addition, as shown in FIG. 3D, the sleeve 20 may have a constant outer diameter such that the sleeve 20 is substantially cylindrical shaped. However, profiles of the sleeve 20 are not limited to those shown in FIGS. 3A-3D.

Figure 4:
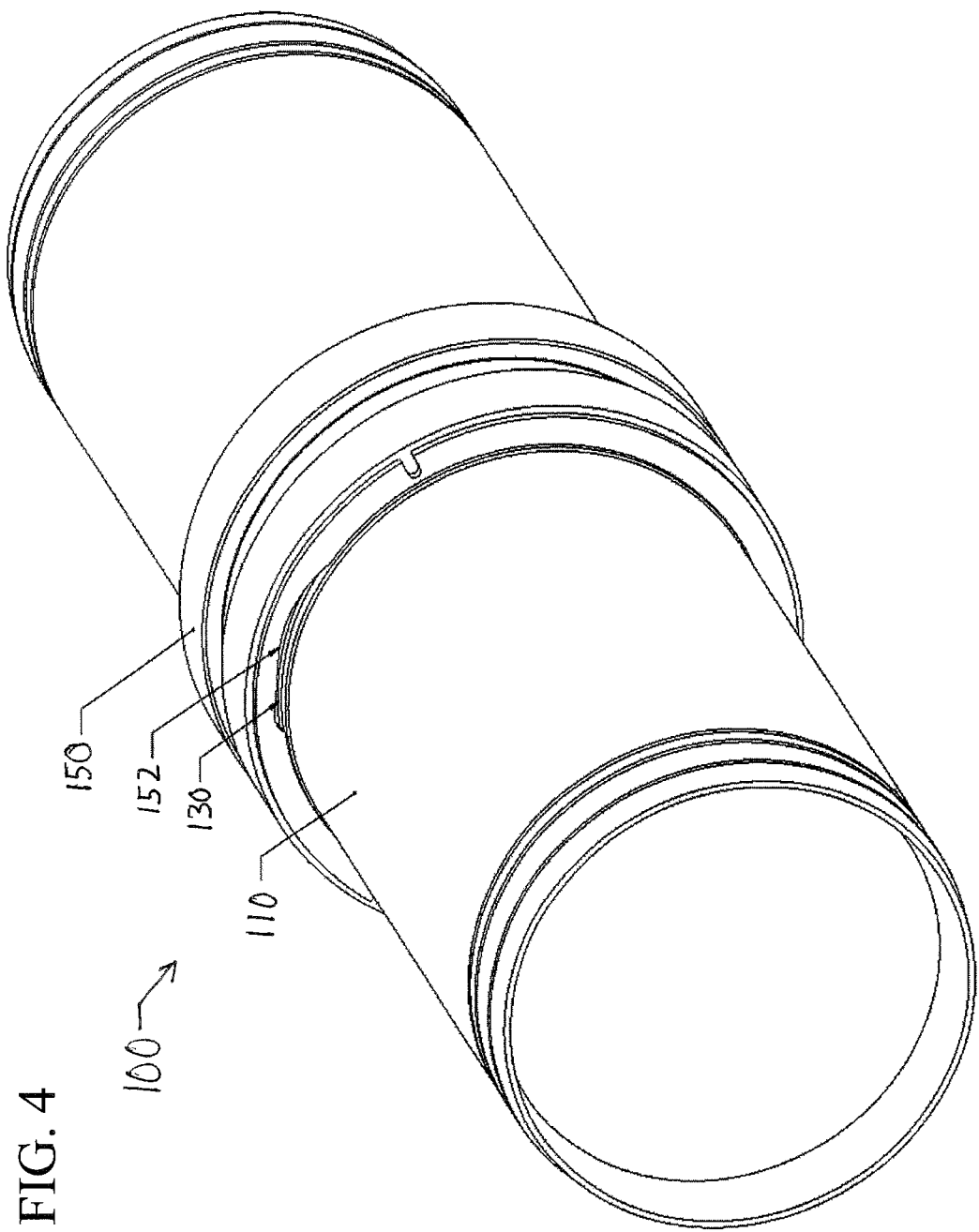
FIG. 4 includes an isometric view of a pipe connector according to one or more embodiments of the present disclosure.
Figures 5A, 5B:
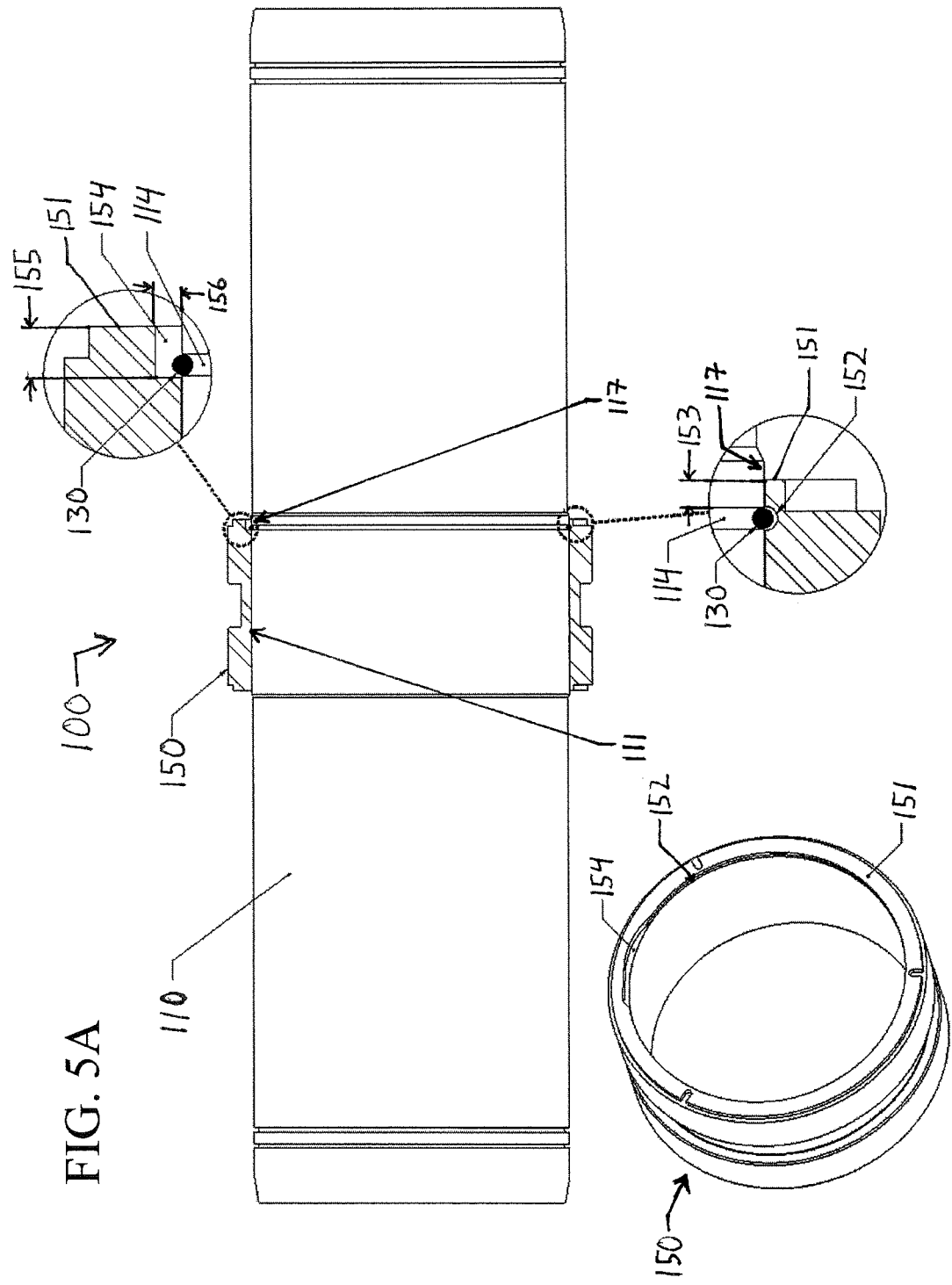
FIGS. 5A and 5B include multiple views of a pipe connector according to one or more embodiments of the present disclosure.

Referring now to FIGS. 4, 5A, and 5B, multiple views of a of a pipe connector 100 according to one or more embodiments of the present disclosure is shown. In one or more embodiments, the pipe connector 100 may include an elongate tubular body 110, a sleeve 150, and a wire ring 130. The elongate tubular body 110 may be coupled to the sleeve 150 using the wire ring 130.

In one or more embodiments, the elongate tubular body 110 may have a raised portion 111 along an outer diameter of the elongate tubular body 110 such that an outer diameter of the raised portion 111 is greater than the outer diameter of the elongate tubular body 110. The raised portion 111 may be generally disposed in a center of the elongate tubular body 110. Further, in one or more embodiments, a groove 114 may be formed on the outer diameter of the raised portion 111, and the groove 114 of the elongate tubular body 110 may be located adjacent to a first end 117 of the raised portion 111. The groove 114 of the elongate tubular body 110 may be formed around the entirety of a circumference of the raised portion 111 of the elongate tubular body 110. Similar to other embodiments, the elongate tubular body 110 may be made of super-duplex stainless steel.

In one or more embodiments, the sleeve 150 may have an inner diameter slightly larger than the outer diameter of the raised portion 111 of the elongate tubular body 110. The sleeve 150 may be coupled to the elongate tubular body 110, and the sleeve 150 may be located over the raised portion 111 of the elongate tubular body 110. A groove 152 may be formed on an inner diameter of the sleeve 150 proximate a first end 151 of the sleeve 150. The groove 152 of the sleeve 150 may be complimentary to the groove 114 of the elongate tubular body 110. Further, the grooves 114 and 152 may be positioned adjacent to each other such that the sleeve 150 and the elongate tubular body 110 may be coupled together by a wire ring 130 disposed in the grooves 114 and 152. Furthermore, the groove 152 of the sleeve 150 may be spaced from the first end 151 of the sleeve 150 by a distance 153. Additionally, a wire insertion cutout 154 may be formed on the first end 151 of the sleeve 150 and may extend a distance 155 from the first end 151 such that an entirety of the groove 152 is exposed. In one or more embodiments, the wire insertion cutout 154 may have a height 156 that is slightly larger than a diameter of the wire ring 130. Further, by way of example, in one or more embodiments, the wire insertion cutout 154 may have a swept angle up to 30°. The wire insertion cutout 154 may be large enough to allow insertion of the wire ring 130 into the grooves 114 and 152 in order to couple the elongate tubular body 110 and the sleeve 150 such that the elongate tubular body 110 and the sleeve 150 are longitudinally fixed relative to each other. In one or more embodiments, the sleeve 150 may be made of super-duplex stainless steel. Further, in one or more embodiments, the sleeve 150 may have a central cut out region on an outer diameter of the sleeve 150 to aid in handling of the sleeve 150, but other profiles of the sleeve 150 similar to those shown in FIGS. 3A-3D may be utilized as discussed above.

In one or more embodiments, similar to the wire rings 30 and 40 discussed above, the wire ring 130 may be manufactured by forming wire stock to a diameter sufficiently smaller than the diameter of the groove 114 of the elongate tubular body 110. The wire ring 130 may be made from wire stock that is rolled into rings leaving ends of the rings free such that the wire ring 130 may be spread in order to install the wire ring 130 through the wire insertion cutout 154 and into the groove 114 of the elongate tubular body 110 and the groove 154 of the sleeve 150, which are complimentary. Further, in one or more embodiments, the wire ring 130 may be made of super-duplex stainless steel.

Assembly of a pipe connector 100 may begin with sliding a sleeve 150 over an outer diameter of an elongate tubular body 110. The sleeve 150 may be slid over the outer diameter of the elongate tubular body 110 until the entirety of the sleeve 150 is disposed over raised portion 111 of the elongate tubular body 110, and the sleeve 150 may be orientated such that the groove 152 of the sleeve 150 faces and is complimentary to a groove 114 of the raised portion 111 of the elongate tubular body 110. Once the groove 152 of the sleeve 150 and the groove 114 of the elongate tubular body 110 are aligned, a wire ring 130 may inserted into the aligned grooves 114 and 154. Inserting the wire ring 130 into the aligned grooves 114 and 154 may include manipulating the wire ring 130, which is pliable, in order to feed the wire ring 150 through a wire insertion cutout 154 of the sleeve 150.

The above described method of assembling a pipe connector may be used for the manufacture of mid-line connectors as well as end fittings. While one or more embodiments disclosed above may be directed towards a pipe connector assembled as a mid-line connector in a pipeline, the pipe connectors as disclosed above may be assembled as end fittings in a pipeline. In one or more embodiments, the pipe connector used for the end fitting in the pipeline will be disposed adjacent to an end of the elongate tubular body on which the pipe connector is coupled and assembled as discussed above with regard to the pipe connector for the mid-line connector in the pipeline. Further, the pipe connectors according to one or more embodiments of the present invention do not need to be formed by welding sleeves to elongate tubular bodies due to the use of wire rings and grooves strategically disposed on the sleeves and elongate tubular bodies. Elimination of a welding process greatly saves cost and time of production of pipe connectors due to the elimination of staffed certified welders, reduced welding material costs, and elimination of weld inspection costs. Further, due to the ease of assembly of the pipe connectors according to one or more embodiments of the present invention, more pipe connectors can be manufactured and assembled versus any previous method of production of pipe connectors. Further, elimination of the welding process allows for the use of dissimilar metals for the parts used to form the pipe connectors. In other words, cheaper parts may be manufactured for non-essential parts of the pipe connectors in order to save on cost of materials. Additionally, elimination of the welding process leads to removal of heat affected zones in the manufactured pipe connectors, which can be more susceptible to corrosion.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

The invention claimed is:

1. A pipe connector for connecting pipes comprising:
   an elongate tubular body having a groove formed on an outer diameter, wherein the elongate tubular body comprises a width, a length, an inner bore extending the length of the elongate tubular body, and a raised portion that is generally in the center of the elongate tubular body, wherein the length is longer than the width, and wherein the groove of the elongate tubular body is located on the raised portion of the elongate tubular body;
   a sleeve coupled to the elongate tubular body, the sleeve having a groove formed on an inner diameter that is spaced from a first annular end face of the sleeve and aligned with the groove of the elongate tubular body, wherein the sleeve further comprises a wire insertion cutout formed on the first annular end face of the sleeve that extends from the first annular end face of the sleeve across the groove of the sleeve;
   a first wire ring entirely disposed within the groove of the elongate tubular body and within the groove of the sleeve,
      wherein the sleeve is coupled to the elongate tubular body by the first wire ring, and
      wherein the first wire ring is disposed entirely within the groove of the elongate tubular body and the groove of the sleeve through the wire insertion cutout.

2. The pipe connector according to claim 1, wherein the sleeve is longitudinally fixed relative to the elongate tubular body by the first wire ring.

3. The pipe connector according to claim 1, wherein a cross-section of the sleeve is substantially one of U-shaped, L-shaped, and T-shaped, and wherein the sleeve has a substantially cylindrical inner bore extending longitudinally through the sleeve.

4. The pipe connector according to claim 1, wherein the pipe connector is a mid-line pipe connector.

5. The pipe connector according to claim 1, wherein the pipe connector is an end fitting.

6. The pipe connector according to claim 1, wherein the wire insertion cutout comprises a swept angle up to approximately 30 degrees.

7. The pipe connector according to claim 1, wherein the wire insertion cutout extends along only a portion of the first annular end face.

8. The pipe connector according to claim 1, wherein the wire insertion cutout comprises a size and shape corresponding to the first wire ring.

9. The pipe connector according to claim 1, wherein no portion of the first wire ring extends beyond the groove of the elongate tubular body or the groove of the sleeve.

10. A method of assembly of a pipe connector comprising:
providing a sleeve that comprises a groove formed on an inner diameter, wherein the groove is spaced from a first annular end face of the sleeve, and a wire insertion cutout formed on the first annular end face of the sleeve that extends from the first annular end face of the sleeve across the groove of the sleeve;
coupling the sleeve to an elongate tubular body,
wherein the elongate tubular body comprises
a width,
a length,
an inner bore extending the length of the elongate tubular body,
a raised portion that is generally in the center of the elongate tubular body, and
a groove that is located on the raised portion of the elongate tubular body,
wherein the length is longer than the width,
wherein the groove is located on an outer diameter of the elongate tubular body,
and wherein coupling the sleeve to the elongate tubular body comprises:
sliding the sleeve over an outer diameter of the elongate tubular body until the groove on the inner diameter of the sleeve is aligned with the groove of the outer diameter of the elongate tubular body; and
inserting a first wire ring entirely into the groove of the elongate tubular body and the groove of the sleeve that are aligned, wherein inserting a first wire ring entirely into the groove of the elongate tubular body and the groove of the sleeve that are aligned comprises:
passing the first wire ring through a wire insertion cutout of the sleeve.

11. The method according to claim 10, wherein the first wire ring is inserted in a circumferential direction when passed through the wire insertion cutout of the sleeve.

12. The method according to claim 10, wherein no portion of the first wire ring extends beyond the groove of the elongate tubular body or the groove of the sleeve after insertion.

* * * * *